(12) United States Patent
McNicol

(10) Patent No.: US 6,363,262 B1
(45) Date of Patent: Mar. 26, 2002

(54) COMMUNICATION DEVICE HAVING A WIDEBAND RECEIVER AND OPERATING METHOD THEREFOR

(75) Inventor: John Duncan McNicol, Vaucresson (FR)

(73) Assignee: Northern Telecom Limited, St. Laurent (CA)

(*) Notice: Subject to any disclaimer, the term of this patent is extended or adjusted under 35 U.S.C. 154(b) by 0 days.

(21) Appl. No.: 09/218,234

(22) Filed: Dec. 22, 1998

(30) Foreign Application Priority Data

Dec. 23, 1997 (GB) .............................................. 9727211

(51) Int. Cl.⁷ ................................................ H04B 1/10
(52) U.S. Cl. ........................ 455/561; 455/266; 455/303; 455/313
(58) Field of Search .................................. 455/552, 553, 455/561, 562, 132, 133, 136, 137, 141, 254, 255, 256, 266, 303, 306, 307, 313, 317, 318, 323, 339, 340; 370/347

(56) References Cited

U.S. PATENT DOCUMENTS 5,497,395 A    3/1996  Jou
5,592,480 A  * 1/1997  Carney et al. ............... 370/347
5,745,846 A  * 4/1998  Myer et al. .................. 455/303

FOREIGN PATENT DOCUMENTS

EP          0803993         4/1997

* cited by examiner

*Primary Examiner*—Lester G. Kincaid
(74) *Attorney, Agent, or Firm*—Lee, Mann, Smith, McWilliams Sweeney & Ohlson

(57) ABSTRACT

To accommodate for a release of uncleared spectrum in a wideband communication system (10) while improving isolation in a receiver (FIG. 4) between wideband carriers, a common intermediate frequency converter down-converts differing but relatively high frequency carriers, incident to the receiver, to corresponding differing but relatively low frequency carriers. Receiver chains (174–176) response to the plurality of relatively low frequency carriers each have a filter (140–144) arranged to isolate selected ones of the relatively low frequency carriers. In a radio frequency communication system having three or more frequency sequential carriers, the receiver chains (174–176) may include branches that have filters that further isolate carriers within the receiver by applying non-sequential carriers to the branches in each receiver chain.

22 Claims, 6 Drawing Sheets

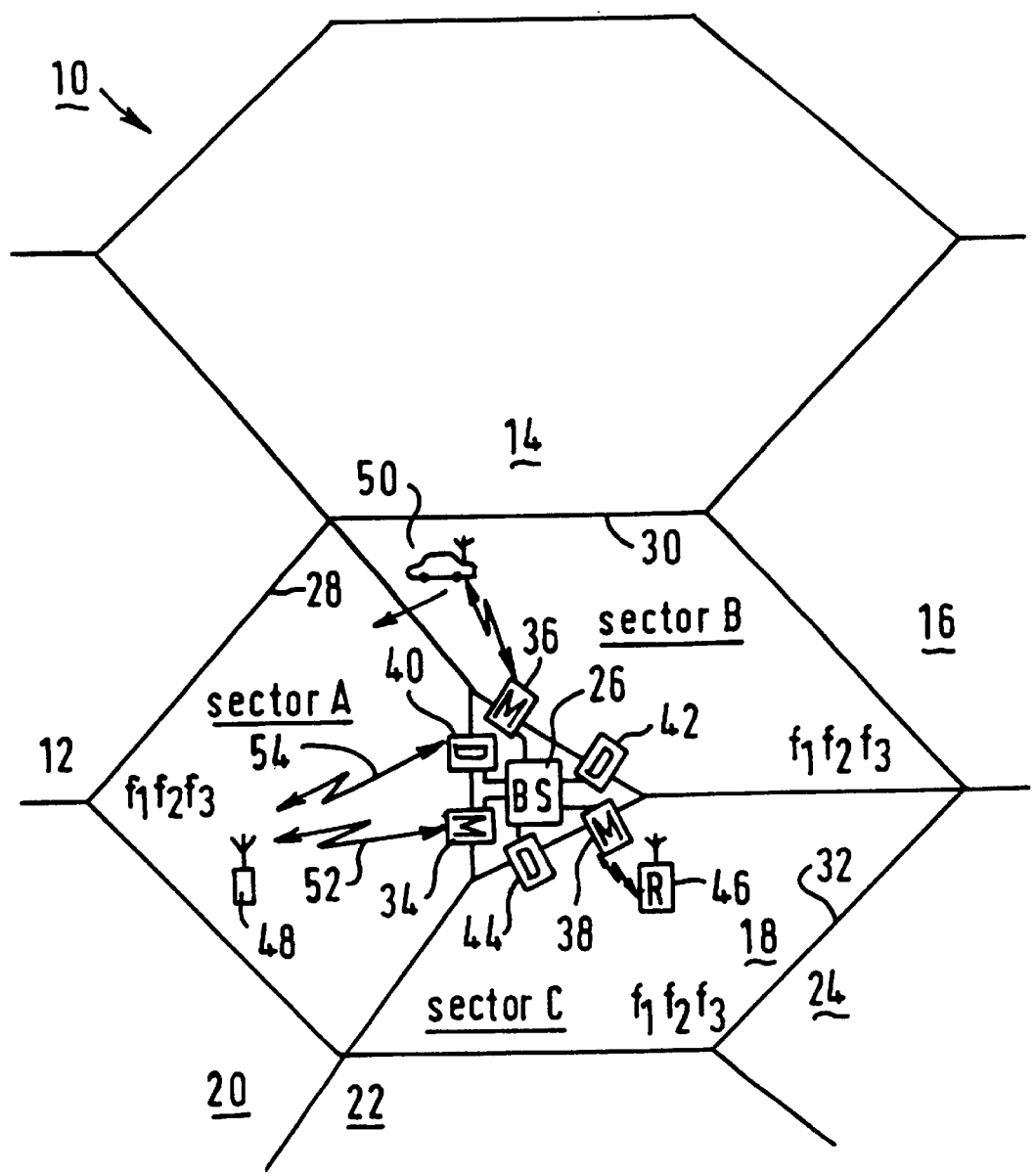

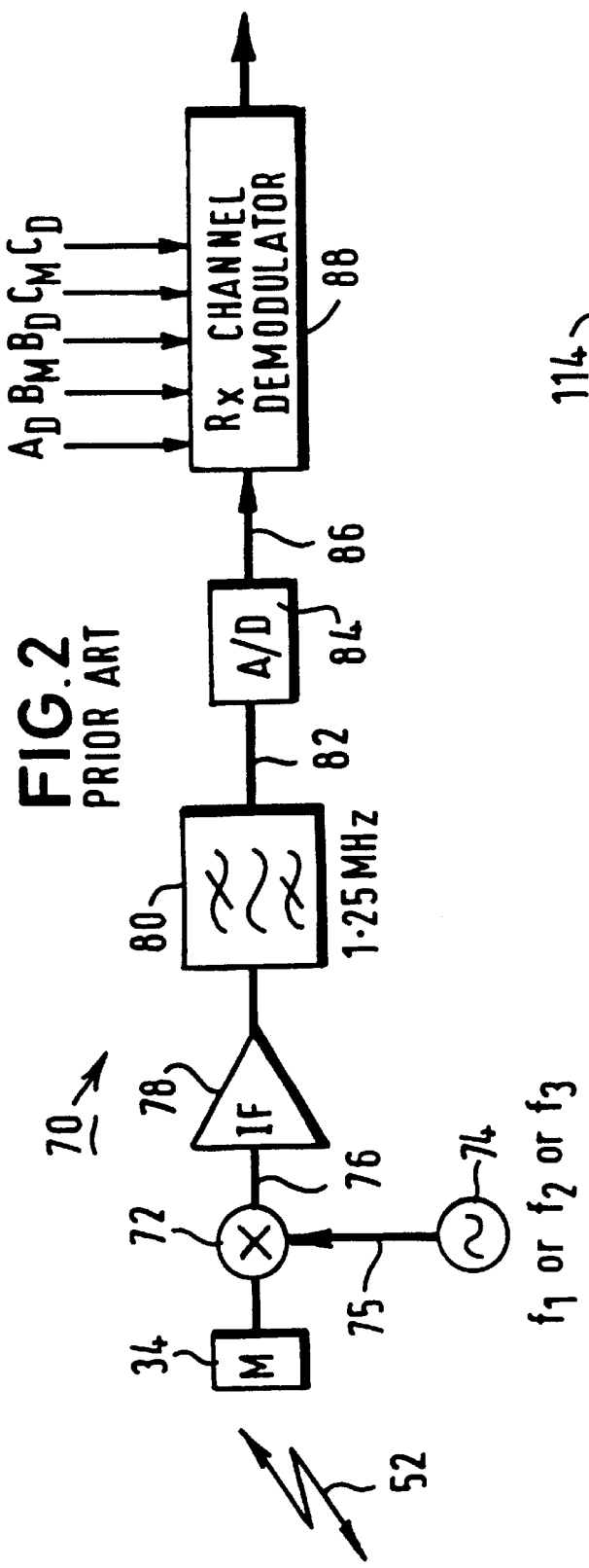
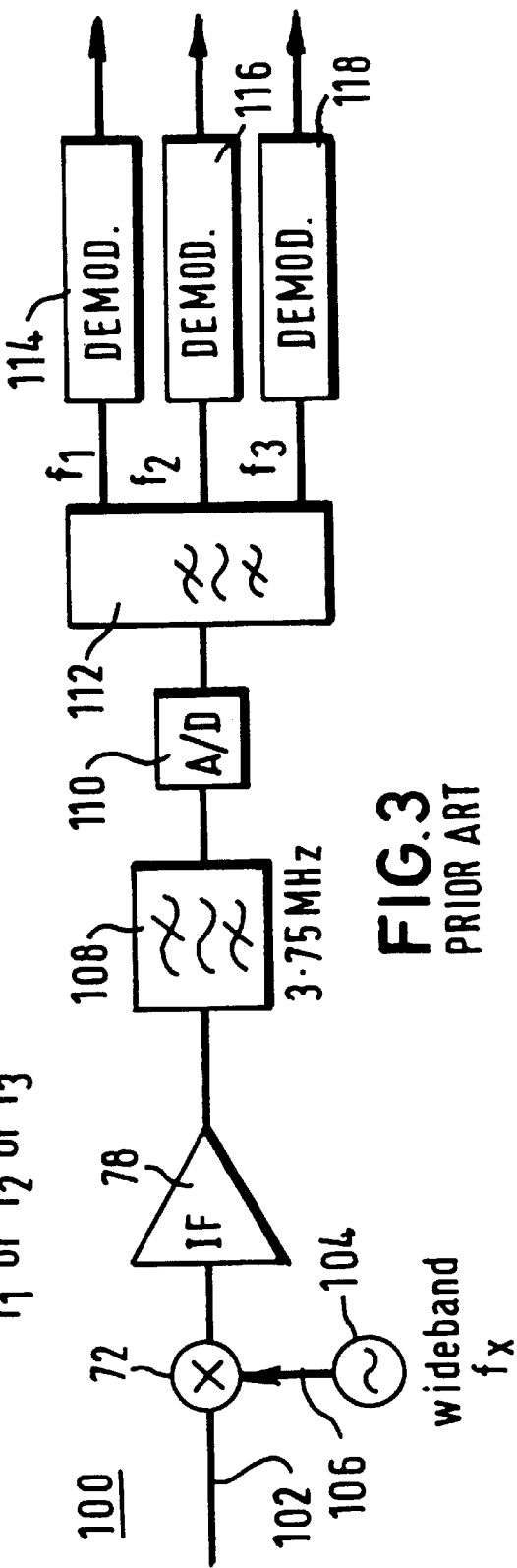

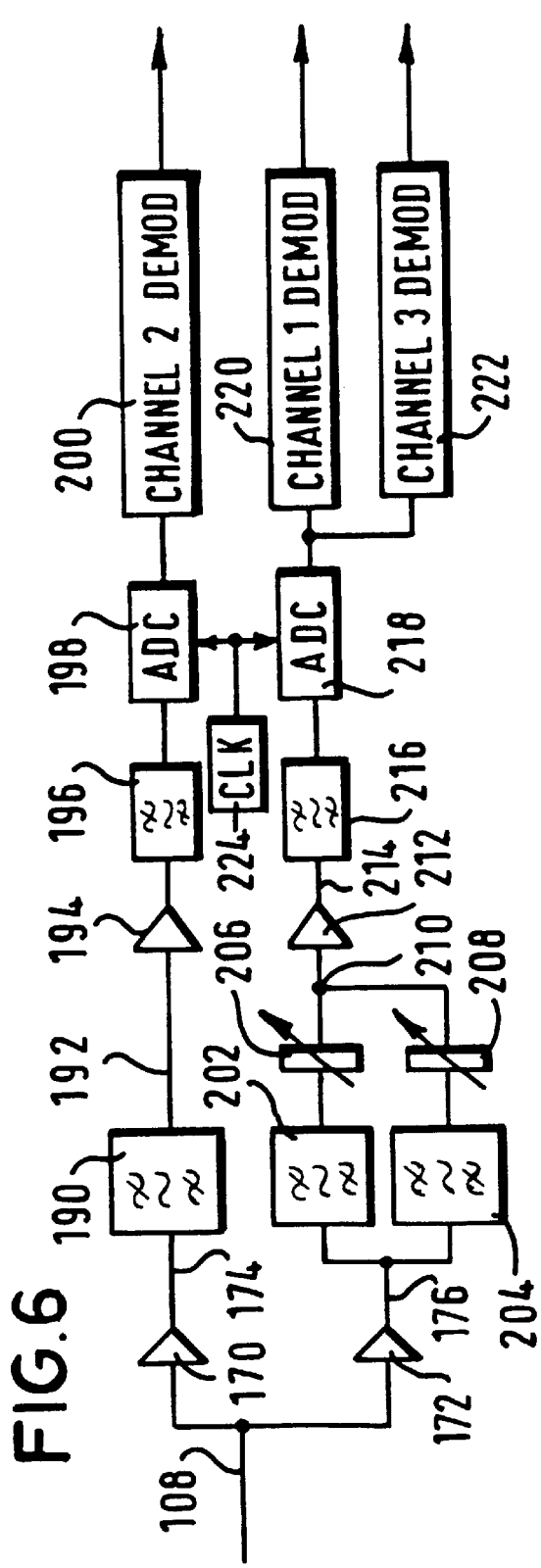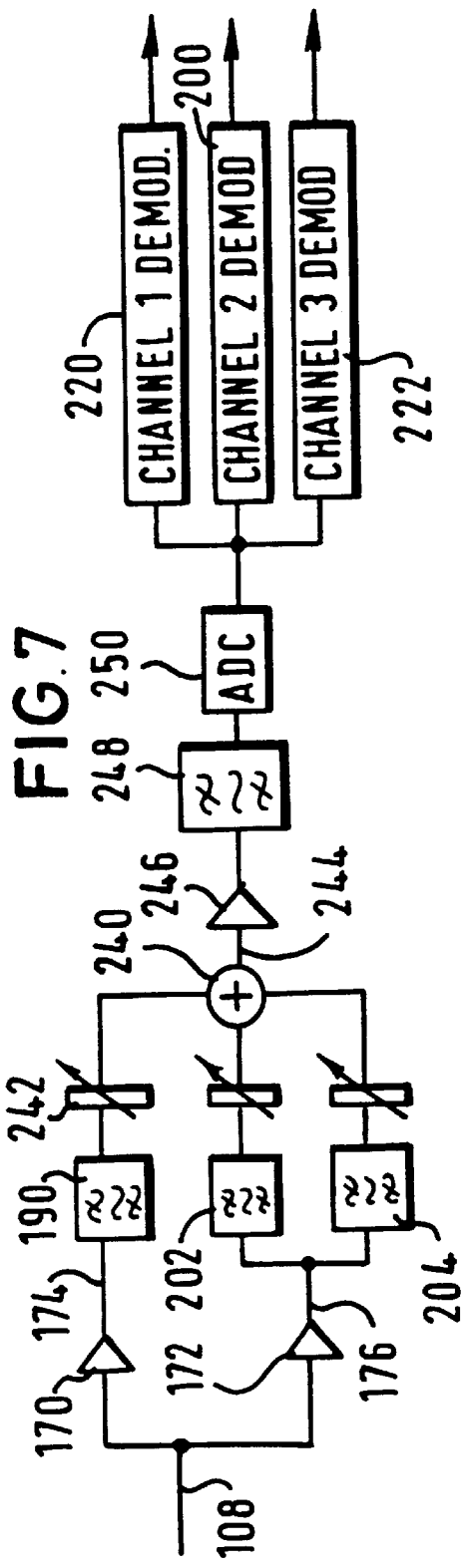

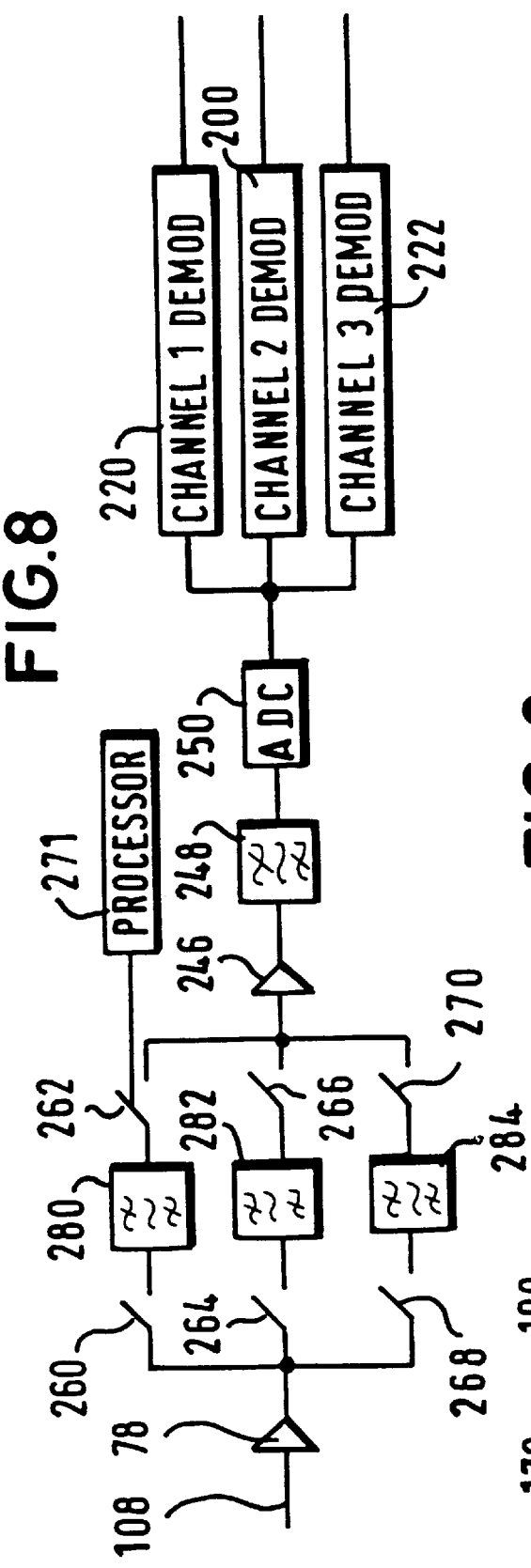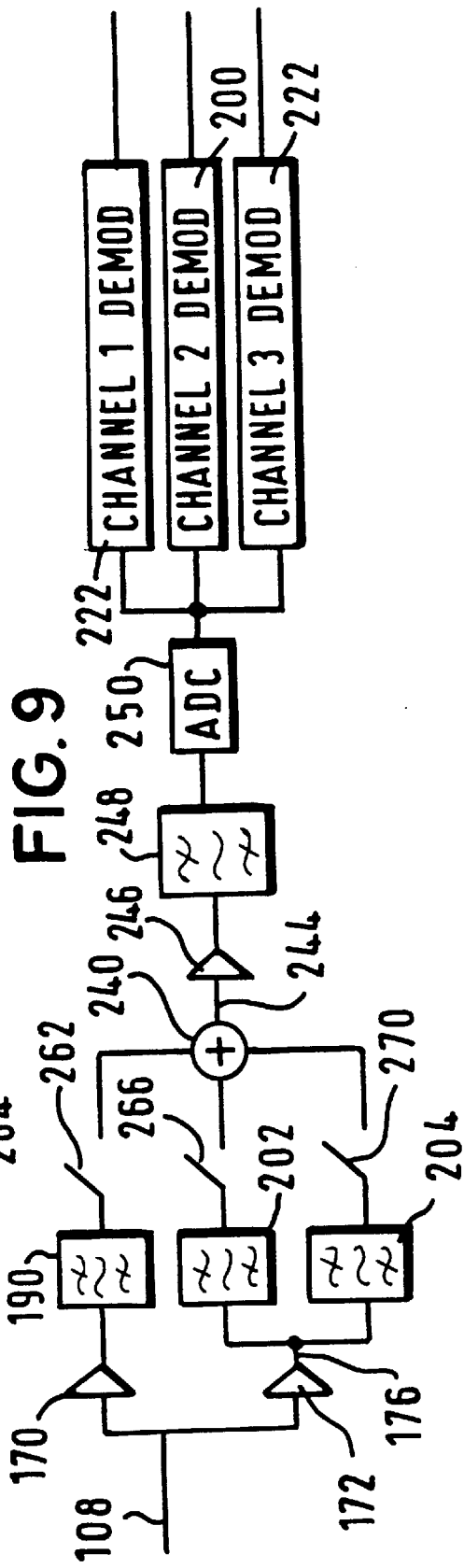

COMMUNICATION DEVICE HAVING A WIDEBAND RECEIVER AND OPERATING METHOD THEREFOR

FIELD OF THE INVENTION

This invention relates, in general, to a communication device having a wideband receiver capability and an operating method therefor, and is particularly, but not exclusively, applicable to a communication system operating a universal frequency re-use pattern, such as deployed in a code division multiple access (CDMA) environment, in which the use of such a wideband receiver is required to recover broadband signals from a selection of available spectral bands.

SUMMARY OF THE PRIOR ART

Radio frequency (RF) communication systems offer an effective mechanism for supporting data and voice communications. Indeed, cellular RF systems can be quickly deployed to cover large geographic areas, with subscribers to the cellular service merely requiring a handset (or RF modem) to obtain access to the cellular network. This is in stark contrast with conventional wire-line communication systems that necessarily require individual line connections (in the form of twisted pairs or optical fibres) to be made to each subscriber terminal. In fact, the cost of deploying a RF-based cellular service is relatively inexpensive to terms of both time and cost when compared against a wireline system having a similar service capability.

The desirability of implementing RF communication systems is, however, tempered by the limited radio frequency spectrum that is available to support such services. Indeed, commercial cellular services, for example, do not have a uniform spectral frequency allocation on a global basis, with different countries assigning different spectral bands to the same form of service. Furthermore, commercial RF services, generally, are assigned frequency bands that are slotted in between military frequency systems, reserved frequency bands allocated for emergency services and other stellar, commercial or scientific frequency bands. Furthermore, in relation to the assignment of frequencies, national regulatory bodies (such as the Federal Communication Commission (FCC)) allocate radio frequency bandwidth for particular communication services. Indeed with respect to this allocation of frequency, the regulatory authority may not necessarily allocate a single block of spectrum to a particular service, but instead may assign discrete, smaller blocks of spectrum. Indeed, the smaller blocks of spectrum can be supplied from a combination of previously unused spectrum and now system-defunct spectrum that no longer supports a particular form of radio communication, e.g. low RF military application. Consequently, a supplier of infrastructure equipment, particularly, must provision for the subsequent release of radio spectrum for the stipulated communication protocol, e.g. a CDMA modulation scheme.

Consequently, cellular equipment manufacturers, generally, must necessary design systems and handsets that can be adapted (after initial deployment) to support new frequency bands subsequently made available to a network operator, while also having to manufacture equipment that operates at different frequencies. In this latter respect, a change in the operating frequency does not necessarily require a simple alteration in the receiver front end, but instead may require re-design of a significant portion of a transceiver to order to produce an operational unit at a different frequency. Clearly, any re-design of equipment is both costly and time consuming for the manufacturer.

Nevertheless, the popularity of RF-based systems is placing ever-increasing demands on the limited radio spectrum, and in this respect cellular communication systems have been developed that attempt to optimise that available bandwidth. For example, the global system for mobile (GSM) cellular communication systems operates a time division multiplexed scheme in which a carrier frequency supports a number of time multiplexed communication channels, with each carrier frequency framed into time slots.

Unfortunately, time division multiple access (and, for that matter, frequency division multiple (FDM) schemes, generally) necessarily operate frequency re-use patterns within the cellular system. More specifically, cells in the system have frequency carriers assigned to them (usually) on a permanent basis and in a way that interference between frequency carriers on an adjacent channel and co-channel basis is minimised. In other words, re-use of a first carrier frequency may be prohibited in adjacent cells so as to improve the radio environment by limiting potential interference (caused by a substantially identical frequency carriers corrupting the integrity of each others data).

In an attempt to further enhance capacity of time division multiplexed (TDM) systems, re-use patterns may, in fact, be on a sector basis, with each cell containing typically three or more sectors. In this way, lower power transmissions may be used, whereby interference from a particular frequency carrier is reduced (as a consequence of the effective transmission distances of these lower power signals) and carrier re-use hence increased. Furthermore, present TDM systems can operate frequency patterns that employ the underlay of microcells (or picocells) beneath macrocells. Again, such a system increases capacity, but still suffers from co-channel and adjacent channel interference.

A more efficient cellular communication scheme is the nineteen-hundred MegaHertz (MHz) personal communication system (PCS) operated in North America, which scheme operates a code division multiple access (CDMA) technique.

In contrast to TDM-based cellular systems, a CDMA system has a universal frequency re-use that allows frequencies to be used across the entire network, i.e. there is a frequency re-use of one. Such CDMA systems operate by virtue of the fact that a single carrier frequency supports a number of communication resources that are structured from discrete, coded sequences. More specifically, each channel is comprised from a unique coded sequence of "chips" that are selected from a relatively long pseudo-random spreading sequence (typically many millions of bits in length). A communication device therefore has access to an information-bearing channel by virtue of a communication device having particular and detailed knowledge of a specific code that identifies the specific bits used by the information-bearing channel. More particularly, information (such as voice or data) is spread across many chips of the spreading sequence on a unique basis, with a processing gain of the system determined by the number of chips required to construct a single data bit. In this way, less than one bit of information is transmitted per chip.

CDMA systems therefore inherently operate in an interference environment because many channels utilise the same carrier frequency, with individual channels merely differing from one another in terms of their uniquely defined coded sequences. However, CDMA systems become statistically efficient for large populations of users, and therefore present an attractive and more efficient alternative to FDM-based systems.

CDMA systems must therefore necessarily impose and retain strict power controls on all transmissions, with this being particularly important in relation to transmissions from mobile communication devices. Unfortunately, CDMA systems are prone to operational instability in the face of "rogue mobiles" in close proximity to base station transceivers and which rogues mobiles transmit at high power levels. As will now be appreciated, high-powered transmissions from the rogue mobile will swamp the universal frequency carrier and therefore corrupt information bearing chips, with this effect known as the "near-far" problem. Indeed, the near-far problem can ripple-through and potentially unbalance the whole CDMA system to an extent where system-wide failure can result; this is clearly catastrophic for a network operator and must be avoided at all costs.

Other mechanisms that allow the radio spectrum to be utilised more efficiently include that concept of using lower bit-rate voice coders (termed "vo-coders"). Unfortunately, while increasing the number of available channels, low bit-rate vo-coders reduce the quality of the speech, and are hence less desirable to users because they impair the communication.

To date, infrastructure manufacturers (principally) have produced equipment that has separate receiver chains for each frequency in a CDMA system, i.e. different frequency carriers are applied to distinct receiver chains. This form of architecture is expensive to manufacture because each receiver chain must contain: a dedicated frequency oscillator for frequency down conversion; an intermediate frequency amplifier; an analog pass-band filter having a bandwidth appropriate for the frequency channel; a relatively low specification analog-to-distal (A/D) converter; and a back-end receiver channel having a digital filter and demodulation circuitry. As such, in order to allow a network operator some flexibility in system development, additional (and initially redundant) hardware may need to be incorporated into a base station at a time when it is unclear as to what (if any) additional blocks of frequency will subsequently be made available to the network operator. The architecture is therefore not only inflexible in terms of future system enhancement and development, but the provisioning of additional receiver chains increases the cost of the equipment, although its omission (while cheaper in the short term) may ultimately incur greater expense for the network operator as a consequence of the requirement for expensive in situ modification of a base station.

Alternatively, prior art wideband receivers utilise a local oscillator that down-converts incident radio frequency signals (in a mixer) to a range of selectable, intermediate frequencies. Again, the receiver chain will include an intermediate frequency amplifier and an analog filter, although the analogue filter will this time have a wide bandwidth commensurate with the bandwidth required to accommodate all possible frequency carriers. For example, the bandwidth of such a wideband filter would need to be at least 3.75 MHz in order to support three 1.25 MHz frequency carriers (ignoring the requirement for guard bands). However, in the alternative mechanism, a high specification (and therefore high-cost) A/D converter is required.

In relation to the alternative wideband mechanism of the prior art, only recent advances in filter technology (especially in relation to surface acoustic wave (SAW) devices) and A/D converter technology (particularly component manufacturing techniques) have made wideband architectures economically feasible and realisable. Notwithstanding the foregoing, multichannel receivers presently still have difficulty in efficiently meeting the requirements of TIA (Telecommunication Industry Association) interim standard IS-97 "Recommended minimum requirements for base stations..." because, in order to accommodate rogue mobiles, the system nevertheless requires sensitive gain-controlled and high specifications A/D converters.

U.S. Pat. No. 5,497,395 describes a system and method of communicating information within a digital communication system and especially a spread spectrum (code division multiple access) system. A receiver chain of the system contains a series arrangement of a receiver demodulator and an analog-to-digital converter, with this document providing background and framing the present invention in context.

EP-A-0 803 993 describes a transceiver arrangement that is arranged to switch traffic channels within spread spectrum beams of a satellite system. Specifically, a single frequency carrier supports a number of users, with processing restricted to individual channel recovery on that single carrier.

It would be desirable to produce relatively low-cost receiver chain for a communication device (such as a base station or a handset) that can accommodate multiple frequency carriers, while not employing the use of relatively circuitry or the physical duplication of the entire receiver chain for each carrier.

SUMMARY OF THE INVENTION

According to a first aspect of the present invention there is provided a receiver circuit for a communication device, the receiver circuit arranged to receive a plurality of carriers having relatively high but differing frequencies, the receiver circuit comprising: a frequency converter coupled to receive and arranged to down-convert the relatively high frequency carriers to a plurality of relatively low but differing frequency carriers; and a plurality of receiver chains response to the plurality of relatively low frequency carriers, the plurality of receiver chains each having a filter arranged to isolate selected ones of the plurality of relatively low frequency carriers.

In another aspect of the present invention there is provided a base station for a communication system having a universal frequency re-use scheme, the base station having a receiver circuit arranged to receive a plurality of modulated wideband carriers having relatively high but differing frequencies, the receiver circuit comprising: a frequency converter coupled to receive the plurality of modulated wideband carriers and arranged to down-convert the relatively high frequencies to a plurality of relatively low but differing frequency carriers; and a plurality of receiver chains response to the plurality of relatively low frequency carriers, the plurality of receiver chains each having a filter arranged to isolate selected ones of the plurality of relatively low frequency carriers.

In a preferred embodiment, the receiver circuit is arranged to receive at least three relatively high frequency carriers and wherein at least one of the receiver chains comprises a plurality of branches, each of the plurality of branches containing a filter arranged to isolate selected ones of the plurality of relatively low frequency carriers.

Preferably, the at least three relatively high frequency carriers occupy contiguous frequency bands, and wherein the plurality of branches contain filters that isolate carriers having a non-contiguous frequency band relationship therebetween and, more especially, a next but one frequency band relationship.

In another aspect of the present invention there is provided a method of isolating a plurality of carriers incident to a receiver of a radio frequency communication system having a universal frequency re-use pattern, the plurality of carriers having relatively high but differing frequencies, the method comprising the steps of: applying the plurality of carriers to a common frequency converter arranged to down-convert the relatively high frequencies to a plurality of relatively low but differing frequency carriers; and isolating selected ones of the plurality of relatively low frequency carriers by applying the plurality of relatively low frequency carriers to a plurality of receiver chains each having a dedicated band-pass filter.

The method preferably includes the step of isolating carriers by applying non-sequential carriers to a plurality of branches within the receiver chains.

Advantageously, therefore, the present invention provides a relatively low cost receiver chain that can be readily adapted to support a number of wideband carriers having stipulated frequency ranges. Moreover, the present invention has a flexible architecture that can accommodate subsequent carrier (channel) release. Furthermore, the partitioning of adjacent frequency channels between different branches of the receiver chain improves performance by enhancing isolation of potentially interfering signals.

BRIEF DESCRIPTION OF THE DRAWINGS

Exemplary embodiments of the present invention will now be described with reference to the accompanying drawings in which:

FIG. 1 is a block diagram representing a sectorised cellular communication system having a universal re-use pattern;

FIG. 2 is a block diagram of a prior art receiver architecture for a single carrier frequency;

FIG. 3 is a block diagram of a prior art wideband receiver;

FIG. 6 illustrates another embodiment of the present invention;

FIG. 7 illustrates still yet another embodiment of the present invention;

FIG. 8 illustrates a further embodiment of the present invention;

FIG. 9 illustrates still yet a further embodiment of the present invention; and

DETAILED DESCRIPTION OF THE PREFERRED EMBODIMENT

Figure 4:
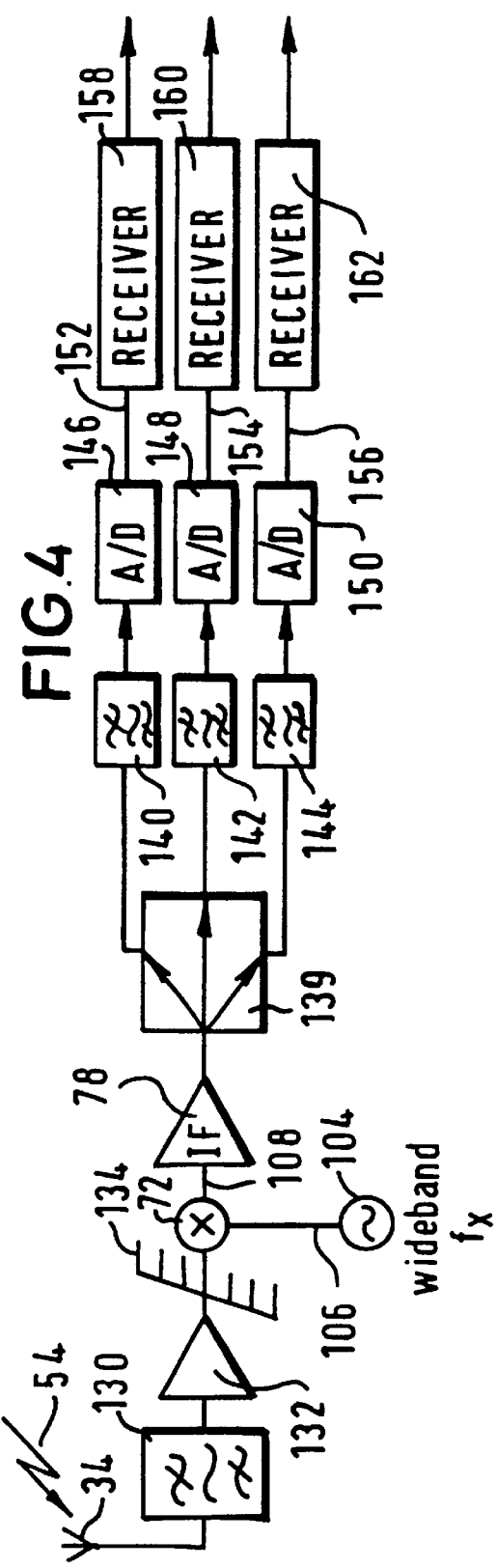
FIG. 4 illustrates a block diagram of a receiver configuration in accordance with a preferred embodiment of the present invention.

Before discussing the present invention in detail, a brief explanation with reference to FIGS. 1 to 4 of the accompanying drawings will clarify the reader's understanding with respect to the problems and structures of the prior art.

Referring to FIG. 1, a block diagram of a prior art cellular communication system 10 is shown. In accordance with conventional techniques, the cellular communications system 10 comprises a plurality of cells 12–24 (shown in conventional hexagonal format). Considering the structure of cell 18 by way of example, cell 18 comprises a base station 26 typically located centrally within the cell to optimise coverage. The base station 26 contains a plurality of transceivers (not shown) that are individually assigned to serve one of the sectors (of which there are three: sector a, sector b and sector c) in cell 18. The base station may also include redundant transceiver equipment (not shown) that can be selectively switched on-line to mitigate against equipment failure.

Each of the sectors is serviced by a main antenna 34–38 and a diversity antennae 40–44. The main antenna and the diversity antenna for each sector may be appropriate for both transmit and receive functions, although for the sake of the present invention an explanation will be restricted to a receive function. Furthermore, each of the sectors 28–32 supports all available frequency carriers ($f_1$, $f_2$ and $f_3$).

Each cell 12–24 also contains a plurality of communication devices 46–50; some of which may be mobile communication devices (e.g. a transportable unit for a car 50 or a hand-held cellular phone 48). Transmissions from the communication devices 46–50 are potentially received at all the main antennas 34–38 and all the diversity antennas 40–44 that interconnect (couple) signals into the base station 26. For example, communication device 48 is shown to have two alternative transmission paths 52–54 to the main and diverse antennas of sector A (reference numeral 28). Therefore, by providing a diverse route for the signal, the communication system mitigates against the effects of multi-path and fading. A rogue mobile 46 can be seen to be in close proximity to the main antenna 38 of sector C (reference numeral 32).

Turning attention to FIG. 2, a hardware block diagram of a carrier frequency signal path in a prior art receiver chain 70 is shown. More specifically, in the receiver chain 70, an antenna of a base station (e.g. main antenna 34 of CDMA base station 26 of FIG. 1) receives suitably modulated radio frequency signals 52 that fall incident on the antenna 34. The modulated RF signals 52 are down converted to a predetermined intermediate frequency through a conventional mixer 72 and local oscillator 74 arrangement. The local oscillator 74 has a limited frequency generation capability and is restricted to supplying a single mixing frequency 75 complementary to one of the carrier frequencies, $f_1$, $f_2$ or $f_3$. Although not shown for the sake of clarity, a receive filter (or diplexer) and a receive amplifier are usually located between the antenna 34 and the mixer 72.

An intermediate frequency signal 76, derived from the mixing frequency 75 and output from mixer 72, is amplified in an intermediate frequency amplifier 78 before being filtered in a band-pass filter 80. The band-pass filter 80 has a bandwidth corresponding to the bandwidth of the frequency carrier, e.g. 1.25 MHz for an IS-95 CDMA system. The filter 80 removes unwanted portions of the radio spectrum and therefore isolates the carrier frequency of interest. A filtered signal 82 that emerges from the filter 80 is then subjected to a digital conversion process in an A/D converter 84, with a digital representation 86 of the wanted signals then applied to a receive channel demodulator 88. The receive channel demodulator 88 is further responsive to similarly processed signals for the wanted receive frequency that have been otherwise received by the diversity antenna 40 of sector A (indicated as $A_d$) together with representations of the wanted signal received by the main and diversity antennas located in the adjacent sectors, i.e. sectors B and C of the cell 18. The function of the receive channel demodulator 88 is to recover information from the modulated signals supplied thereto by the path between the main antennas 34–38 and the diversity antennas 40–44.

In relation to the signal paths of a wanted signal, the nomenclature $B_m$ has been adopted in indicate the sector and antenna derivation of the signal. Therefore, $B_m$ indicates that the signal originates from the main antenna (m) of sector B. while $C_d$ means that the wanted signal originates from the diversity path of sector C.

Where appropriate, components common to the various drawing figures share a common reference numerals.

Referring now to the block diagram and architecture of FIG. 3, in which there is shown a prior art wideband receiver 100. In a similar vein to the architecture of FIG. 2, suitably modulated RF signals 102 are down converted to an intermediate frequency in a mixer 72 and local oscillator 104 arrangement. Unlike FIG. 2, the local oscillator 104 of FIG. 3 generates a mixing frequency 106 that down-converts received RF signals to a band of frequency selectable intermediate frequencies that are subsequently amplified in intermediate frequency amplifier 78. An output from the intermediate frequency amplifier 78 is then filtered in a saw filter device 108 that possesses a wide bandwidth. For example, the saw filter device 108 may have a central frequency of 73.75 MHz for an IS-97 CDMA system and a bandwidth of 3.75 MHz (ignoring guard band requirements). Following isolation of a signal spectrum having a relatively wide bandwidth, an auto-ranging IF-sampling ADC (such as AD6640 device manufactured by Analog Devices) converts incident analog signals into corresponding digitised representations. It is only after digitisation that the wideband signal is converted into separate channels (through the use of a digital filter 112). Therefore, isolation of each carrier (corresponding to the frequency carriers, $f_1$, $f_2$ or $f_3$, of the system) only occurs at the output from the digital filter 112, with each carrier then applied to a dedicated demodulator 114–118. As will now be appreciated, the intermediate frequency wideband (SAW) filter 108 must necessarily possess excellent intermodulation product performance, and is typically realised by an IF gain strip post "close-in" SAW filter. As will also be understood, the auto-ranging IF-sampling A/D 110 is clearly a high performance device that samples at a high bit-rate to maximise dynamic range, while an associated wideband automatic gain control circuit (not shown) must possess an ability to separate small step-size increments. Unfortunately, this wideband configuration has proven to have insufficient compliance in the face of both uncleared frequency blocks (e.g. frequency blocks containing interference) or in the face of a rogue mobile that is transmitting on one of more of the available carrier frequencies. Indeed, a single channel could conceivably have a margin (e.g. between 10 dB and 20 dB) on IS-97 for blocking at offsets of 1250 kHz and larger, giving rise to a co-ordination ability.

With regard to FIG. 4, an improved receiver path arrangement constructed in accordance with a preferred embodiment of the present invention is shown. For the purposes of explanation only, the preferred embodiment of the present invention is described in relation to a receive module for a CDMA communication network having three contiguous frequency carriers spread across a five MHz bandwidth. In practice, this means that each communication carrier nominally has a 1.25 MHz useable bandwidth bounded by 0.675 MHz guard bands.

The preferred embodiment of the present invention utilises a single local oscillator operable to convert received frequencies to intermediate frequencies, whereby cross-talk between multiple synthesisers is eliminated. In this respect, the present invention has a front end similar to the wideband receiver chain of FIG. 3.

Looking in detail at the diagram of a preferred embodiment of the present invention, incident RF signals 54 are received by antenna (such as main antenna 34) and routed, via a radio frequency filter or diplexer 130 to an amplifier 132. Received signals are amplified by amplifier 132 before being fed to a six-way splitter 134.

As will be appreciated, use of diplexer (or circulator) enables the antenna to be used for transmission as well as reception of suitably modulated RF signals and accommodates the integration of a power amplifier into the circuit, while the six-way splitter 134 provides representations of the received signals to other reception paths within the base station. In this latter respect, the six-way splitter 134 hence endows the base station with an ability to provide a soft hand-over capability, whereby a mobile communication device can be retained on an antenna of a particular sector notwithstanding that the mobile communication device has, during an on-going communication, moved from one sector to a different sector. In this way, the communication system is seen to provide a seamless transmission, during handover, while the communication system also benefits from not having to implement excessive changeovers for mobiles operating along sector boundaries.

Returning the FIG. 4, in a similar way to the prior art architecture of FIG. 3, the preferred embodiment of the present invention utilises a single oscillator 104 that provides a mixing frequency 106 for application to a mixer 72. The mixer 72 causes down-conversion of the incident RF signals 54 to an acceptable band of intermediate frequency signals 108. Following down-conversion, the band of intermediate frequency signals 108 can be amplified in an intermediate frequency amplifier 78, with an output from the intermediate frequency amplifier 78 being split (in a three-way splitter 139, as appropriate) and individually applied to separate and distinct band-pass filters 140–144. The individual band-pass filters each have a narrow bandwidth that is centred about one of the assigned frequency carriers in the assigned block of spectrum. The pass-band nature of each of the individual filters 140–144 therefore isolates each frequency carrier prior to an information bearing modulated signal of each carrier being digitised in conventional (and relatively low cost) A/D converters 146–150, similar in construction to the A/D converter of FIG. 1. Digitised representations 152–156 of each of the information-bearing channel carriers are then applied to individual and separate demodulators 158-162 for recovery of encoded information.

The three-way splitter 139 will introduce a signal loss of 4.7 dB, as will be appreciated. Additionally, in relation to the architecture of FIG. 4, it will be appreciated that the three-way splitter coupled be substituted for a four way-splitter in which one of its outputs is terminated to ground through a suitable load, such as a resistor. Generally, the hybrid splitter arrangement of FIG. 4 is realised by a succession of cascaded splitters that operate to isolate the various frequency signals, with each successive cascade causing additional signal loss proportional to the number of branches provided as outputs from the splitter.

In relation to the construction of the in-line filters, a 1.25 MHz bandwidth IF filtering specification can be met by a low-loss, temperature-stable quartz SPUDT-type SAW filter having an operating frequency of approximately 70 MHz, while the downstream effects caused by intermodulation are minimal. Additionally, the circuit can operate with a 30 decibel (dB) gain between the antenna and each ADC (of which approximately half, i.e. 15 dB, is required after the SAW device. Additionally, the filter should preferably have performance rejection figures approximating to a −26 dB stopband beyond a ±1.25 MHz offset from mid-band (i.e. ±625 kHz from the pass-band edges) and an attenuation of −80 dB at the aliasing frequencies. Generally, in-line ADCs, implemented as AD6600s, would be clocked at 19.6608 MHz.

The architecture of FIG. 4 therefore provides a receiver module capable of providing a receive radio frequency carrier selection for three contiguous CDMA carriers covering, for example, a 3.75 MHz PCS allocation. Typically, each relatively narrow bandwidth filters 110–114 is implemented as a SAW device, while the A/D converters (or "ADCs") are implemented in conventional ADC strip technology. Indeed, the circuit configuration of FIG. 4 is IS-97 compliant with a 10 dB margin on single tone desens and spurious intermodulation attenuation for up to three RF carriers, while the circuit does not require that the entire 5 MHz bandwidth (for a three carrier system) be cleared prior to hardware deployment. Furthermore, the circuit maintains effective operation (without impairment of reception capabilities) even in the face of co-carrier interferers jamming any two of the available carriers (in a three-carrier system).

The present invention therefore provides several advantages over a wideband receiver in that multiple spectrum blocks can easily be provided (subject to diplexer bandwidth limitations), while the arrangement is inherently more compatible with initially uncleared spectrum. Specifically, while the receiver module front end has a simplified single oscillator arrangement, processing of the received signals and isolation of individual frequency carriers, at an intermediate frequency, is achieved by discrete chains comprising a narrowband filter, an A/D converter and a receiver demodulator. These chains are easily manufactured on a modular basis, and can be programmed (in accordance with known techniques) to address and decode specific frequency carriers.

The packaging of the receiver modules further saves costs in that the co-location of the filters and the ADCs is more easily fabricated, with the filters and the ADCs having a relatively low specification and hence a relatively low cost. Additionally, as a general consequence of the infrastructure being relatively inexpensive, implementation of CDMA type technology is encouraged. Moreover, the present invention provides several advantages over single carrier receivers in that there is a lower cost and size for carrier counts of two or more (obtained through the elimination of duplicated circuitry), with a close to cost parity with respect to single carrier usage.

Figure 5:
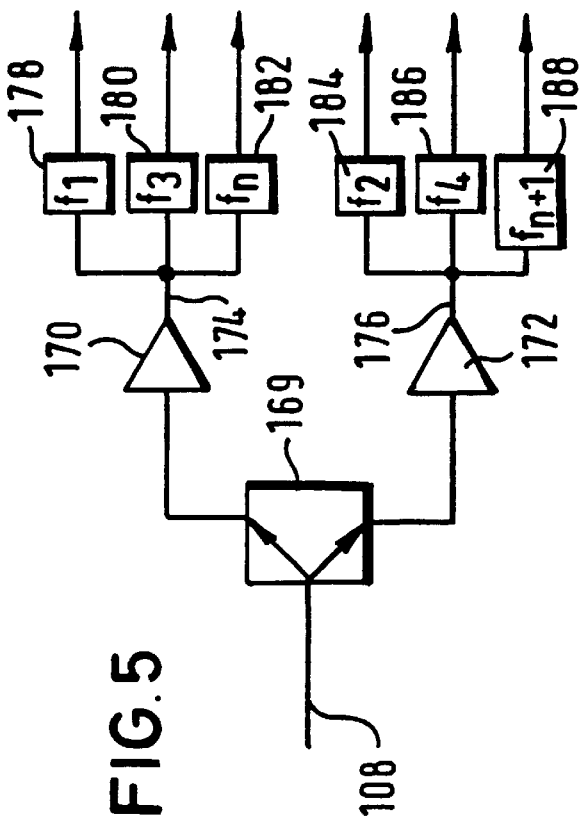
FIG. 5 illustrates an alternative embodiment of the present invention.

A further enhancement to the basic principle of the present invention is shown in FIG. 5. Rather than providing a common intermediate frequency amplifier, intermediate frequency signals 108 are each feed through separate paths (but at least two paths provided by a single, two-way frequency splitter 169) to be amplified by parallel, wide bandwidth intermediate frequency amplifiers 170–172 that feed separate receiver branches 174–176, respectively. Again, it is only after intermediate frequency amplification that the individual carriers are isolated by discrete band-pass filters 178–188 which then feed dedicated A/D converters assigned to each carrier (in an identical fashion to the arrangement of FIG. 4). Again, an auto-ranging IF-sampling ADC (such as the AD6600) would be suitable fir use in the circuit of FIG. 5. The arrangement of the discrete band-pass filters 178–188 in the separate receiver branches 174–176 is structured such that the odd or even carriers are separated between each of the receiver branches 174–176, i.e. each filter is separated from any adjacent filter by a carrier spacing of one carrier. In other words, the branches (and hence the receiver chains) are responsible for processing non-sequential carriers. In this way, the enhanced structure afforded by FIG. 5 ensures that the filters substantially do not interact by ensuring that: i) each filter characteristic has ostensibly tailed-off before cross-over of adjacent filter characteristics; and ii) filter interactions caused by reflections from subsequent components in the receiver chain are minimised.

Since a frequency "gap" exists between adjacent channel filters, the embodiment of FIG. 5 allows these filters to be driven, if desired, by a single amplifier within each branch. Indeed, unlike the embodiment of FIG. 4 that typically realises the 3-way splitter 139 as a transformer-based hybrid splitter, FIG. 5 has reduced signal loss as a consequence of merely having to provide a conventional (non-hybrid) two-way split with 3 dB signal reflection.

The structure of FIG. 5 can therefore reduce manufacturing costs by allowing the use of lower specification filters, while still providing a low complexity solution. Particularly, the circuit arrangement of FIG. 5 is devoid of a hybrid splitter, and so there is an associated cost saving and saving in circuit board area. Additionally, the elimination of a hybrid splitter prevents a loss in signal power provided at an output stage of an amplifier associated therewith.

Clearly, the concept behind FIG. 5 could be extended to provide three or more separate receiver branches, with the isolation between each filter still further improved by having a sequential assignment of carrier bands between each set of filters fed from a common intermediate frequency amplifier, i.e. a first common IF amplifier could serve carriers $f_1$, $f_4$ and $f_7$, while a second common IF filter could serve carrier $f_2$, $f_5$ and $f_8$, etc.

A further embodiment of the present invention is shown in FIG. 6 in which intermediate frequency signals 108 are applied to different branches 174–176 prior to being amplified in IF amplifiers 170–172. A first branch 174 includes a first band-pass filter 190 having a central operating frequency of approximately 73.75 MHz and a bandwidth of approximately 1.25 MHz. Following filtering, second carrier signals 192, centred about the operating frequency of the first band-pass filter, are amplified in a first narrowband amplifier 194 before being applied to a series combination of a filter 196, a first ADC 198 and a second channel demodulator 200. In the second branch 176, following IF amplification, amplified IF signals are applied to parallel IF second 202 and third 204 band-pass filters. The second bandpass filter 202 has a central operating frequency of approximately 72.50 MHz and a bandwidth of approximately 1.25 MHz, while the third bandpass filter 204 has a central operating frequency of approximately 75.00 MHz and a bandwidth of approximately 1.25 MHz. Outputs from both the second 202 and third band-pass filters are each applied to respective variable attenuators 206–208. Following attenuation, the carrier signals are combined at node 210 before being applied to a second narrowband amplifier 212. First and third carrier signals 214 are then applied in series to a filter 216 and a second ADC 218. After conversion to digital representations, first and third carrier signals are applied to discrete, parallel channel demodulators 220–222. In this way, the first and third carriers share a common digitising circuit.

The first ADC 198 and the second ADC 218 are responsive to a clock 224 generating, for example, an operating frequency reference of 19.6608 MHz.

In the structure of FIG. 6, a central carrier (at 73.75 MHz) is digitised by the first ADC 298, while carriers either side of this central carrier are digitised in the second ADC 218.

The filter characteristics for FIG. 6 are similar to those described in relation to FIGS. 4 and 5. First and third carrier signals are summed together via the variable attenuators that function to allow one of the filter outputs to be attenuated in the case of excessive jamming.

Clearly, the variable attenuators of FIG. 6 could be substituted for switches that function to terminate a signal path. Additionally, while separate ADCs 198 and 218 are shown, the skilled addressee will appreciate that, after filtering and prior to digitisation, the carrier signals could be combined. Consequently, one of the ADC could be eliminated provided that the remaining ADC operated in a multiplexed fashion. Without using a faster ADC, this configuration would however more an image closer to the passband, and could therefore adversely affect attenuation.

Turning now to FIG. 7, a further embodiment of the present invention is shown. FIG. 7 has a similar structure to that of FIG. 6, but all carriers (from both branches 174–176) are combined in a summing unit 240. Unlike the configuration of FIG. 6, the second carrier signal applied to the first bandpass filter 190 is also applied to a variable attenuator 242 in parallel with the variable attenuators used for the first and third carriers. Following summing of the signals in summing unit 240, a combined signal is applied in series to an amplifier 246, a band-pass filter 248 that rejects image noise (specifically by attenuating noise from amplifier 246 at image frequencies) and an auto-ranging IF-sampling ADC 250. The ADC 250 then separates individual carrier signals for application to respective channel demodulators 200, 220–222.

As will be appreciated, if the band-pass filters of FIG. 7 are realised by SPUDT SAW filters (that do not have a linear phase), the circuit of FIG. 7 would require there to be an appropriate offset in the phases of the filters to ensure that these phases aligned at the band edges of the filter parameters. In this respect, for a two or three carrier design (having two or three filters, respectively) this phase offset can be accomplished independent of an absolute delay incurred through the band-pass filters.

Generally, the ADCs of the preferred embodiment of the present invention all operate by over-sampling. As will be understood by the skilled addressee, over-sampling is beneficial because it reduces filter cost by reducing the effects of channel images from each of the individual band-pass (carrier) filters. In the instances of a shared bank-end (occurring with the recombination of the carrier signals, such as shown in FIG. 7), time sharing of the receiver path is required FIG. 8 is another variant based on FIG. 7. In the embodiment of FIG. 8 offers a programmable strip arrangement by providing programmable switches for carrier isolation. Specifically, pairs of programmable switches 260–270 isolate the band-pass filters 280–284 from a receiver path, and hence can eliminate the effects of a rogue mobile transmitting on one of the carriers. The programmable switches 260–270 are typically operationally responsive to a microprocessor 271 (with only one connection to switch 262 indicated for the sake of clarity). Furthermore, unlike the previous embodiments, the band-pass filters 280–284 have differing bandwidths ranging from approximately 1.25 MHz through 2.50 MHz to 3.75 MHz. Consequently, the use of non-identical filters therefore requires accurate matching of the phases of each filter.

FIG. 9 is a further enhancement of the basic structure of the embodiment of FIG. 8, although in the case of FIG. 9 all band-pass filters revert to a uniform bandwidth centred on each carrier frequency. Isolation of the individual receive paths for each of the carriers is still achieved through the use of switches, although in this embodiment only a single switch is provided after each band-pass filter 190, 202–204. To achieve a high attenuation, the band-pass filters are arranged in branches that service non-adjacent carrier signals, as in FIG. 5.

Figure 10:
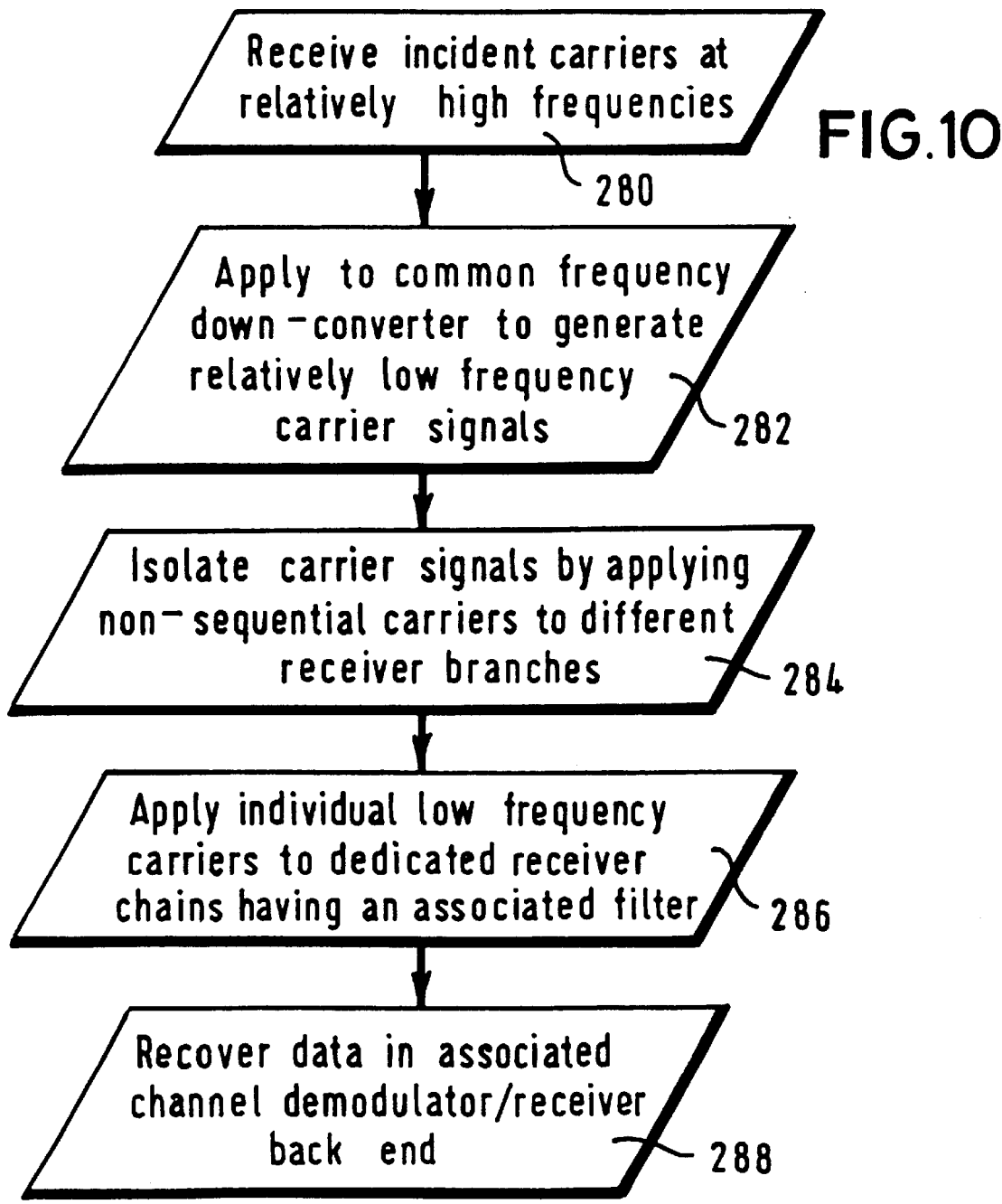
FIG. 10 is a flow diagram demonstrating a wideband signal recovery mechanism for a preferred embodiment of the present invention.

Briefly turning to FIG. 10, a flow diagram demonstrating a wideband signal recovery mechanism for a preferred embodiment of the present invention is shown. At step 280, incident carrier signals at relatively high frequencies are received by the receiver (or transceiver) equipment. These incident signals are down-converted 282 to respective (and relatively low-level) frequency carriers by a common frequency down-converter. Following generation of, typically, intermediate frequency signals (rather than baseband signals), the low frequency carrier signals are preferably isolated (in accordance with FIG. 5, for example) by applying non-sequential carriers to different receiver branches (step 284). Individual (and frequency distinct) low frequency carriers are then applied, at step 286, to dedicated receiver chains having associated band-pass (or functionally equivalent) filters. Data encoded within (i.e. modulated onto) the carrier can finally be recovered (step 288) by associated channel demodulator/receiver back-end circuitry.

In summary, the present invention advantageously allows reception of a block of radio frequency carriers in a single circuit module, while satisfying the performance requirements of IS-97 on each individual radio frequency carrier. Additionally, the preferred embodiment of the present invention accomplishes isolation of multiple wideband carriers without requiring free-configuration with respect to a number of carriers to be received, and therefore addresses and resolves problems associated with uncleared spectrum. Moreover, the present invention advantageously provides a modular receiver that can be scaled for a frequency block allocation of 5 MHz or larger, e.g. 15 MHz. Furthermore, use of separate intermediate frequency filters and separate A-D converters for each radio frequency carrier eliminates the possibility of receive channel blocking problems when operated in single or dual channel modes.

Clearly, the improved receiver path architecture of the preferred embodiments of the present invention can be utilised within the generic system configuration shown in FIG. 1.

It will, of course, be appreciated that the above description has been given by way of example only and that modification in detail may be made within the scope of the present invention. For example, while the preferred embodiment of the present invention has been described in relation to a CDMA system (and especially a PCS environment), the present invention is clearly applicable to other communication systems, such as paging and TDM systems and universal mobile telecommunication system (UMTS), that have spectrum subsequently released or cleared for their use. Indeed, the architecture of the present invention is particularly and equally suited to other present or future protocols having 5 MHz-wide digitiser/carrier modules and a universal frequency re-use pattern. Furthermore, while the embodiments of the present invention have generally been in relation to a three-carrier system, it will of course be appreciated that the concepts can be extended to wideband and narrowband systems having two carriers or more carriers that three.

I claim:

1. A receiver circuit for a communication device, the receiver circuit arranged to receive a plurality of carriers having relatively high but differing frequencies, the receiver circuit comprising:

a frequency converter coupled to receive and arranged to down-convert the plurality of relatively high frequency carriers to a plurality of relatively low but differing frequency carriers; and a plurality of receiver chain branches coupled to the output of the frequency converter, each receiver chain branch having a filter arranged to isolate selected ones of the plurality of relatively low frequency carriers thereby facilitating subsequent analog-to-digital conversion.

2. The receiver circuit of claim 1, wherein the plurality of branches contain filters that isolate carriers having a non-contiguous frequency band relationship therebetween.

3. The receiver circuit of claim 2, wherein the non-contiguous frequency band relationship is a next but one frequency band relationship.

4. The receiver circuit of claim 1, wherein each of the plurality of receiver chain branches further comprises a series combination of an analog-to-digital converter and a receiver demodulator for recovering information from selected ones of the plurality of relatively low frequency carriers.

5. The receiver circuit of claim 1, wherein each receiver chain has at least one programmable switch positioned next to the filter, the programmable switch selectively operational to isolate an associated carrier from the receiver circuit.

6. The receiver circuit of claim 1, wherein one of the plurality of receiver chains is allocated to a relatively high frequency carrier having an uncleared spectrum.

7. The receiver circuit of claim 1, wherein each of the plurality of branches contains an isolation means for isolating the branch from its receiver chain.

8. The receiver circuit of claim 7, wherein the isolation means is one of a variable attenuator and a switch.

9. The receiver circuit of claim 7, wherein said each of the plurality of branches shares a common digitizing circuit.

10. The receiver circuit of claim 1, wherein each carrier has a dedicated channel demodulator for recovering modulated information.

11. The receiver circuit of claim 1, wherein said each of the plurality receiver chains shares a common digitizing circuit.

12. The receiver circuit of claim 1, wherein each carrier has a dedicated channel demodulator for recovering modulated information.

13. The receiver circuit of claim 12, wherein each dedicated channel demodulator is coupled to the common digitizing circuit.

14. The receiver circuit of claim 1, wherein each receiver chain includes an intermediate frequency amplifier coupled to the filter and coupled to receive the relatively low frequency carriers.

15. The receiver circuit of claim 1, wherein the receiver circuit is in a transceiver.

16. The receiver circuit of claim 15, wherein the transceiver is a base station that preferably supports code division multiple access communication.

17. The receiver circuit of claim 1, wherein a number of the outputs of the plurality of receiver chain branches are coupled to a series combination of a combiner and an analog to digital converter.

18. A base station for a communication system having a universal frequency re-use scheme, the base station having a receiver circuit arranged to receive a plurality of modulated wideband carriers having relatively high but differing frequencies, the receiver circuit comprising:

a frequency converter coupled to receive the plurality of modulated wideband carriers and arranged to down-convert the relatively high frequencies to a plurality of relatively low but differing frequency carriers; and a plurality of receiver chain branches coupled to the output of the frequency converter each receiver chain branch having a filter arranged to isolate selected ones of the plurality of relatively low frequency carriers, thereby facilitating subsequent analong-to-digital conversion.

19. The receiver circuit of claim 18, wherein the plurality of branches contain filters that isolate wideband carriers having a non-contiguous frequency band relationship therebetween.

20. The receiver circuit of claim 19, wherein the non-contiguous frequency band relationship is a next but one frequency band relationship.

21. The base station of claim 18, wherein a number of the outputs of the plurality of receiver chain branches are coupled to a series combination of a combiner and an analog to digital converter.

22. A method of isolating a plurality of carriers incident to a receiver of a radio frequency communication system having a universal frequency re-use pattern, the plurality of carriers having relatively high but differing frequencies, the method comprising the steps of:

applying the plurality of carriers to a common frequency converter arranged to down-convert the relatively high frequencies to a plurality of relatively low but differing frequency carriers; and isolating selected ones of the plurality of relatively low frequency carriers by applying the plurality of relatively low frequency carriers to a plurality of receiver chain branches coupled to the output of the frequency converter, each branch having a dedicated band-pass filter, thereby facilitating subsequent analog-to-digital conversion.

* * * * *